(12) United States Patent
Xue et al.

(10) Patent No.: US 6,685,490 B1
(45) Date of Patent: Feb. 3, 2004

(54) ELECTRICAL CARD CONNECTOR

(75) Inventors: Zhanglan Xue, Kunsan (CN); Jinkui Hu, Kunsan (CN); Ziqiang Zhu, Kunsan (CN)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 0 days.

(21) Appl. No.: 10/313,126

(22) Filed: Dec. 6, 2002

(30) Foreign Application Priority Data

Sep. 11, 2002 (TW) ..................................... 91214231 U

(51) Int. Cl.[7] .............................................. H01R 13/62
(52) U.S. Cl. ....................................... 439/159; 439/260
(58) Field of Search ................................ 439/159, 260, 439/259, 201, 680, 267, 630, 638, 160, 633, 188, 489, 152–155; 361/73.7, 801

(56) References Cited

U.S. PATENT DOCUMENTS

| | | | | |
|---|---|---|---|---|
| 6,022,228 A | * | 2/2000 | Kuo | 439/159 |
| 6,077,098 A | * | 6/2000 | Yu et al. | 439/326 |
| 6,230,978 B1 | * | 5/2001 | Koseki et al. | 235/475 |
| 6,390,855 B1 | * | 5/2002 | Chang | 439/638 |
| 6,506,074 B2 | * | 1/2003 | Hashimoto | 439/541.5 |
| 6,527,568 B2 | * | 3/2003 | Nakamura | 439/159 |

* cited by examiner

*Primary Examiner*—P. Austin Bradley
*Assistant Examiner*—Phuong-Chi Nguyen
(74) *Attorney, Agent, or Firm*—Wei Te Chung

(57) ABSTRACT

An electrical card connector (100) includes a shielding member (1), an insulative housing (2), an ejector (3) assembled onto one side of the insulative housing, a switch terminal (4), a plurality of first contact terminals (5) retained in a rear portion of the insulative housing and a plurality of second contact terminals (6) retained in a middle portion of the insulative housing. The shielding member has a slot (111) defined at one side. The ejector has a slider (31) moving along the sliding direction between a forward position whereat the contact terminals are not in contact with a corresponding card and a back position whereat the contact terminals are in contact with the card. The slider has a rib (311) formed at a top wall thereof mating with the slot of the shielding member. The slider also has a first mating part (312) and a second mating part (313) respectively abutting against different types of cards.

14 Claims, 3 Drawing Sheets

ELECTRICAL CARD CONNECTOR

BACKGROUND OF THE INVENTION

1. Field of the Invention

The present invention relates to an electrical card connector, specifically to a card connector provided with an ejector for an electrical card reliability inserted in and ejected out.

2. Description of related Art

In electronic appliances, such as portable telephones, PDA, cameras and the like, various expandable functions are achieved by installing IC cards, such as SIM (subscriber identify module) card, MMC (multimedia card), SD (secure digital) card, MS (memory stick) card and the like therein. IC cards have different outer dimension as well as contact pad position. As such, each card requires a tailored card connector for functioning thereof and this brings an inconvenience to the designing engineers. Accordingly, the market is looking a card connector in which different IC cards can be properly and functionally loaded.

U.S. publication. No. 2001/0031571, published on Oct. 18, 2001, discloses a card connector includes a housing with a receiving slot for receiving a card, a metal shell for covering the housing, an eject device having a slider which is pushed in during insertion of the card and moves between a loading position and a insertion position of the card, and a coil spring for biasing the slider back. The slider is received in a recess portion provided along a side of the housing and is covered by the metal shell. When the card is inserted into the card connector, the slider moves forward. When the card is to be ejected, the slider is pushed back to its original position. In the prior art, after a period of usage, the slider of the card connector will be pushed relatively away from the recess and the sliding distance will be changed because of the elastic deformation of the coil spring, which will affect the reliability of the electrical connecting between contacts of the cards and contacts of the card connector and the card can't be positioned fixedly.

Hence, an improved electrical card connector is desired to overcome the disadvantages of the prior art.

BRIEF SUMMARY OF THE INVENTION

A main object of the present invention is to provide an electrical card connector which can receive at least three types of electrical card and which can assure a card reliability inserting.

An electrical card connector in accordance with the present invention including a shielding member, an insulative housing, an ejector, a switch terminal, a plurality of first contact terminals retained in a rear portion of the insulative housing and a plurality of second contact terminals retained in a middle portion of the insulative housing. The shielding member has a slot defined at a top wall thereof. The shielding member covers on top of the insulative housing, and the housing has a receiving cavity which can be compatible with at least three types of electrical cards. The ejector is positioned on one side of the insulative housing. The ejector has a slider. The slider has a rib mating with the slot of the shielding member, a first mating part and a second mating part formed on opposing end thereof. The slider moves in a sliding direction in response to an insertion or ejection of a card. The slider slides between a forward position whereat the contact terminals are not in contact with a corresponding card and a back position whereat the contact terminals are in contact with the card.

Other objects, advantages and novel features of the invention will become more apparent from the following detailed description of the present embodiment when taken in conjunction with the accompanying drawings.

DETAILED DESCRIPTION OF THE INVENTION

Figure 1:
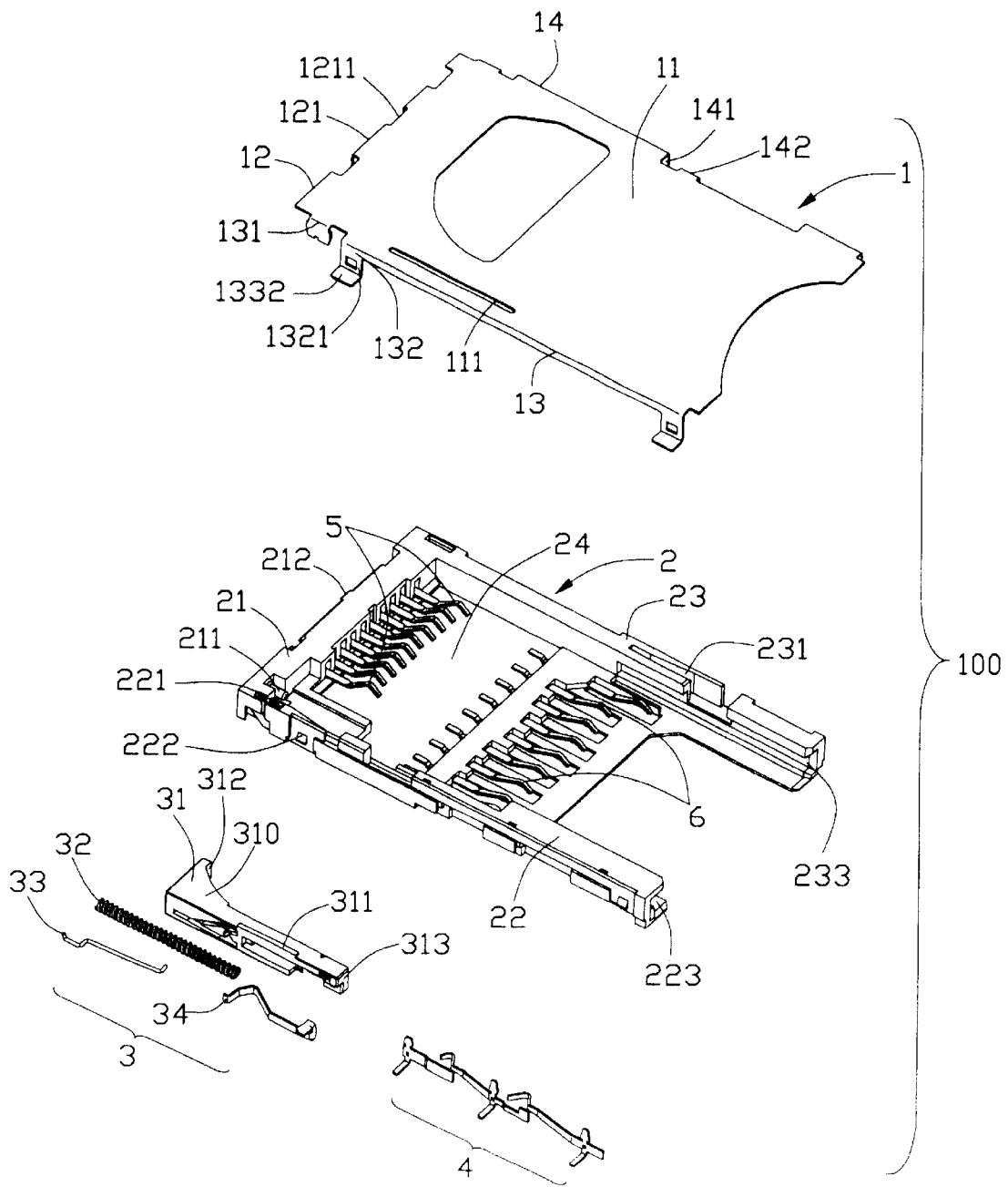
FIG. 1 is an exploded view of an electrical card connector in accordance with the present invention.
Figure 2:
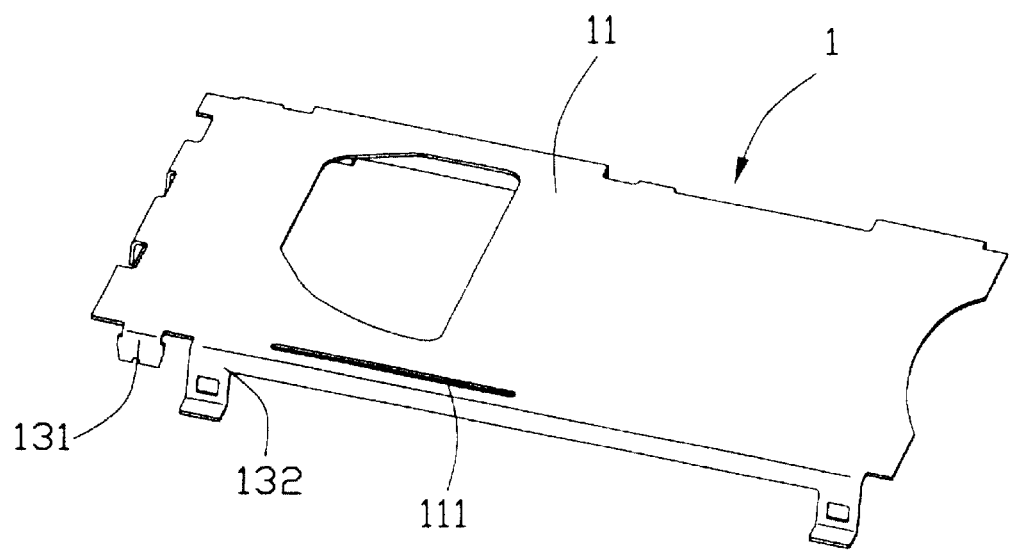
FIG. 2 is an assembled view of FIG. 1, wherein a shield is not attached thereto.
Figure 2:
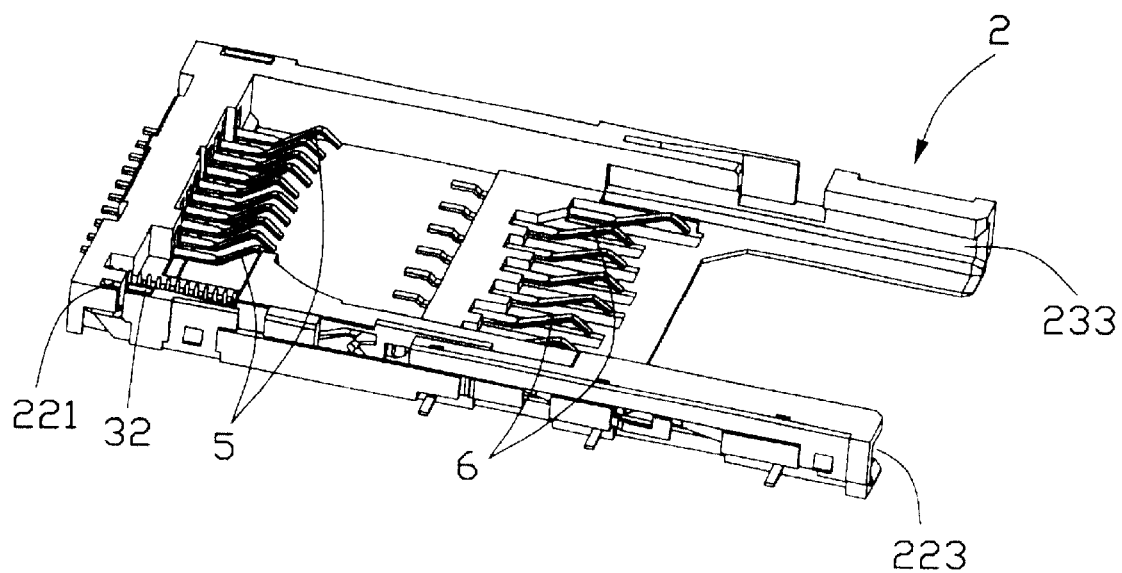
Figure 3:
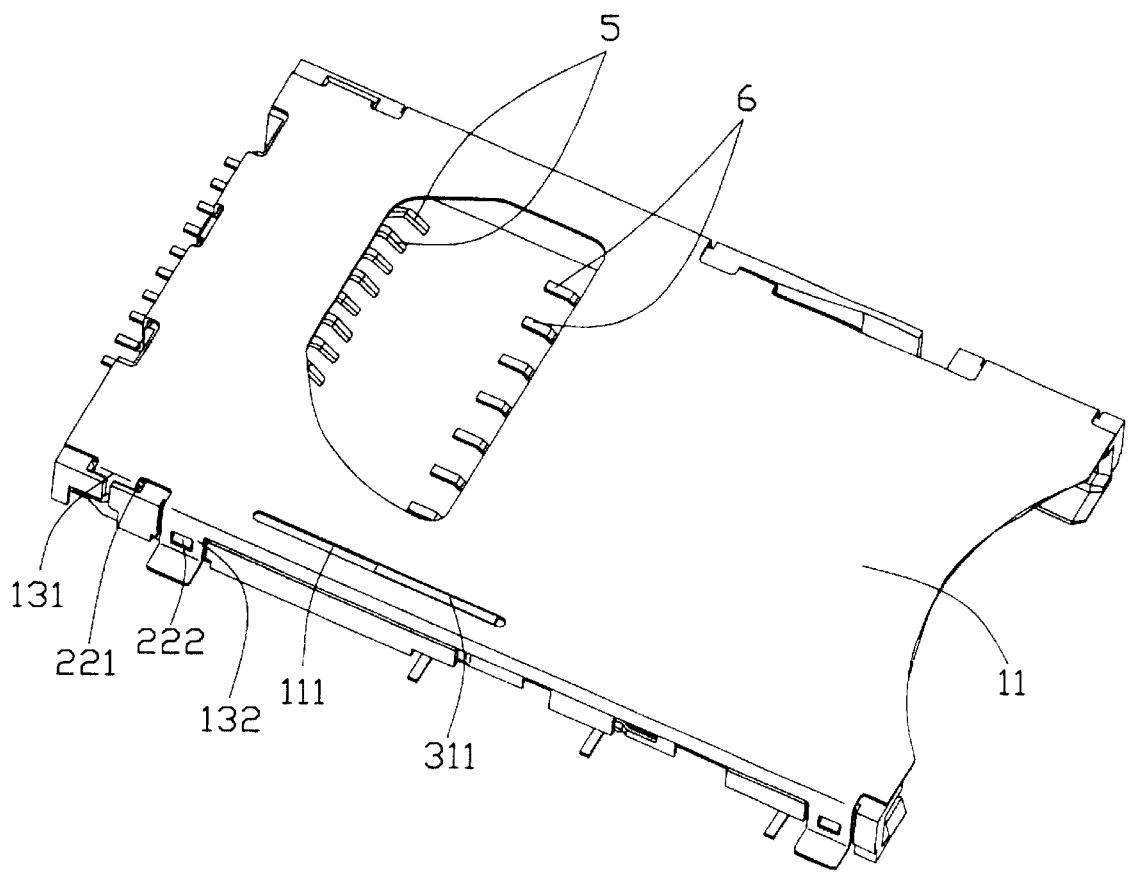
FIG. 3 is an assembled view of FIG. 1.

Referring to FIG. 1, an electrical card connector 100 in accordance with a preferred embodiment of the present invention comprises an insulative housing 2, a shielding member 1 covering on top of the insulative housing 2, an ejector 3 received in one side of the housing 2, switch terminals 4 receive in the same side of the housing 2 with the ejector, a plurality of first contact terminals 5 received in a rear portion of the insulative housing 2 and a plurality of second contact terminals 6 received in a middle portion of the insulative housing.

The shielding member 1 has a top wall 11, a rear edge 12, a first longitudinal side edge 13 and a second longitudinal side edge 14. The top wall 11 defines a slot 111 adjacent to the first longitudinal side edge 13. The rear edge 12 has a latching pad 121 extending downwardly from the top wall 11. The latching pad 121 has a latching hole 1211. The first longitudinal side edge 13 has a first engaging pad 131 and a first holding pad 132 respectively extending downwardly from the top wall 11. The first holding pad 132 has a mating hole 1321, a soldering portion 1332 extending perpendicularly to the holding pad 132. The second longitudinal side edge 14 has a second engaging pad 141 and an elastic pad 142 extending downwardly and forwardly from the top wall 11.

The insulative housing 2 has a rear wall 21, a first side wall 22, a second side wall 23 and a receiving cavity 24. The first sidewall 22 and the second sidewall 23 extend forwardly from the rear wall 21 and respectively terminate in a free end. The receiving cavity 24 is defined by the rear wall 21, the first sidewall 22 and the second sidewall 23. The receiving cavity is compatible with at least three kinds of cards. A post 211 is formed on the rear wall 21 adjacent to the first sidewall 22 and extends into the receiving cavity 24. A wedge 212 is formed on a rear surface of the rear wall 21. The rear wall 21 has a plurality of first terminal receiving cavities (unlabeled) for receiving the plurality of first contact terminals 5. The first sidewall 22 has a first recess 221, a wedge 222. A first guided groove 223 is defined in a free end of the first sidewall 22 and communicating with the receiving cavity 24. The second sidewall 23 defines a second recess 231. A second guided groove 233 is defined in a free end of the second sidewall 23 and communicating with the receiving cavity 24. A plurality of second terminal receiving cavities (unlabeled) for receiving the plurality of second contact terminals 6 are defined at a middle portion of the insulative housing 2 between the first side wall 22 and the second side wall 23.

The ejector 3 has a slider 31, a spring 32, a slider rod 33 and a latching terminal 34. The slider 31 has an L-shaped main body 310 and a rectangular rib 311 formed on a top surface of the main body 310. The main body 310 has a first mating part 312 and a second mating part 313. The slider 31 moves in a sliding direction in response to an insertion of a card and slides between a forward position whereat the card is not inserted and a back position whereat the card is inserted.

In assembly, the spring 32 is positioned onto the post 211 with one end abutting against an inner surface of the rear wall 21 and the other end received in a rearward hole (not shown) of the main body 310. The slider rod 33 is retained in a corresponding holding recess (unlabeled) of the slider 31. The latching terminal 34 is retained in the main body 310 with a spring end (unlabeled) extending onto the receiving cavity 24 through the first side wall 22. The switch terminal 4 is received in a forward portion of the second sidewall 22. The engaging pad 131 is inserted into the first recess 221. The elastic pad 142 is received in the second recess 231. The wedge 212 is received in the latching hole 12 11. The rectangular rib 311 is received in the slot 111.

In use, the electrical card connector 100 is mounted on a printed circuit board (not shown), when a card (not shown) is not inserted in the connector 100, a front end of the rectangular rib 311 abuts against a front peripheral wall of the slot 111. When the card is inserted, such as a Secure Digital (SD) card or a Multimedia card (MMC), along the first guided groove 223 and the second guided groove 233 into a front portion of the receiving cavity 24, a front end of the card abuts against the second mating part 313 of the slider 31 pushing the slider 31 moving toward the rear wall 21 of the insulative housing 2. When the rib 411 engages a rear peripheral wall of the slot 111, the slider 31 stops moving, the slider rod 33 fixed at a latching recess (unlabeled) of the main body 310 of the ejector 3. The elastic pad 142 is inserted into a cutout of the card so that the card is fixed at the position where the second contact terminals connecting with the electrical card. During ejection of the card, the card is pushed toward the inserting direction, the slider rod moves out of the latching recess, the second mating part 313 abuts against the front end of the card and ejects the card.

When another type of card is inserted, such as a memory stick (MS) card. The MS card is inserted into the receiving cavity 24 along inner walls of the pair of sidewalls 22, 23. A front end of the MS card abuts against the first mating part 312 and forces the slider 31 to move toward the rear wall 21. When the rectangular rib 311 abuts against the rear peripheral wall of the slot 111, the slider rod 33 is fixed at the latching recess of the slider 31. The latching terminal 34 mates with a corresponding recess of the MS card so that the card is fixed at the final position and the first contact terminals 5 electrically connect with the MS card. In ejecting, the card is pushed toward the inserting direction, the slider rod 33 moves out of the latching recess, the first mating part 312 abuts against the rear end of the card and ejects the card.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. An electrical card connector, comprising:
    an insulative housing having a receiving cavity;
    a plurality of contact terminals being retained in the insulative housing;
    a shielding member mounted on top of the housing, said shielding member including a top wall and a slot defined at the top wall; and
    an ejector having a slider, said slider including a first mating part and a second mating part for abutting against different types of card, the slider also forming a rib slidably received in the slot formed on top of the shielding.

2. The electrical card connector as described in claim 1, wherein the plurality of contact terminals includes a plurality of first contact terminals retained in a rear portion of the insulative housing and a plurality of second contact terminals spaced from the first terminals retained in a middle portion of the housing.

3. The electrical card connector as described in claim 2, wherein the slider of the ejector is a L-shaped body and disposed between the first contact terminals and the second contact terminals.

4. An electrical card connector, comprising:
    an insulative housing having a receiving cavity for receiving different IC cards;
    a plurality of first contact terminals being retained in a rear portion of the insulative housing for electrical connection with a first inserted card;
    a plurality of second contact terminals spaced from the first contact terminals being retained in a middle portion of the insulative housing for electrical connection with a second inserted card;
    an ejector received in a side portion of the insulative housing, the ejector having a slider, said slider including a first mating part and a second mating part for abutting against different types of card; the slider forming a rib slidably received in a slot formed on a top of a shielding.

5. An electrical card connector for use with at least first and second different type cards, comprising:
    a housing defining a space allowing said cards to be inserted into said space along a front-to-back direction;
    a first set of contacts located in a front area of the housing;
    a second set of contacts located in a rear area of the housing; and
    ejection mechanism associated with said housing and moveable relative to the housing along said front-to-back direction; wherein
    said ejection mechanism includes first and second abutment sections, said first abutment section being adapted to be engaged with the first card which is inserted into the space along the front-to-back direction and engaged with the first set of contacts, said second abutment section being adapted to be engaged with the second card which is inserted into the space along the front-to-back direction and engaged with the second set of contacts; a slider forming a rib slidably received in a slot formed on a top of a shielding.

6. The connector as described in claim 5, wherein said first set of contacts and said second set of contacts extend substantially at a same level.

7. The connector as described in claim 5, wherein said first abutment section and said second abutment section are spaced from each other along said front-to-back direction.

8. The connector as described in claim 5, wherein a shell is attached to the housing.

9. The connector as described in claim 8, wherein said ejection mechanism includes a guiding device to engage at least one of the housing and the shell to assure movement of the ejection mechanism along said front-to-back direction.

10. A method of exclusively mutually receiving first and second different electronic cards in a single card connector, comprising steps of:

provi ding a housing with first and second sets of contacts in thereof different areas along a front-to-back direction;

equipping said housing with an ejection mechanism movable relative to said housing;

forming spaced first and second abutment sections on the ejection mechanism; and inserting either the first card into the housing along said front-to-back direction with abutment against the first abutment section, or the second card into the housing along said front-to-back direction with abutment against the second abutment section; providing a slider with a rib slidably received in the slot formed on a top of a shielding.

11. The method as described in claim 10, wherein said first abutment section and said second abutment section are spaced from each other along said front-to-back direction.

12. The method as described in claim 10, wherein said ejection mechanism is moveable along said front-to-back direction.

13. The method as described in claim 10, wherein a shell is attached to the housing.

14. The method as described in claim 13, wherein said ejection mechanism includes a guiding device to engage at least one of the housing and the shell.

* * * * *